United States Patent
Lavallee et al.

(10) Patent No.: US 10,689,096 B2
(45) Date of Patent: Jun. 23, 2020

(54) ADJUSTABLE CYCLIC STICK

(71) Applicant: Bell Helicopter Textron Inc., Fort Worth, TX (US)

(72) Inventors: Yann Lavallee, St-Hippolyte (CA); Pasquale Spina, Laval (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 257 days.

(21) Appl. No.: 15/904,763

(22) Filed: Feb. 26, 2018

(65) Prior Publication Data

US 2019/0263504 A1 Aug. 29, 2019

(51) Int. Cl.
| | |
|---|---|
| *B64C 13/06* | (2006.01) |
| *B64C 13/04* | (2006.01) |
| *B64C 27/56* | (2006.01) |
| *G05G 9/047* | (2006.01) |
| *B64C 13/14* | (2006.01) |

(52) U.S. Cl.
CPC .......... *B64C 13/06* (2013.01); *B64C 13/0421* (2018.01); *B64C 13/14* (2013.01); *B64C 27/56* (2013.01); *G05G 9/047* (2013.01)

(58) Field of Classification Search
CPC ................................ B64C 13/06; B64C 13/14
See application file for complete search history.

(56) References Cited

U.S. PATENT DOCUMENTS

| | | | | |
|---|---|---|---|---|
| 4,655,416 A | * | 4/1987 | Carnell | B64D 25/04 244/121 |
| 4,811,921 A | * | 3/1989 | Whitaker | B64C 27/56 244/234 |
| 5,431,361 A | * | 7/1995 | Carnell | B64C 27/56 244/121 |
| 5,769,363 A | | 6/1998 | Griswold et al. | |
| 8,991,770 B2 | | 3/2015 | Bandera | |
| 9,969,484 B2 | * | 5/2018 | Norwitz | B64C 13/06 |
| 2016/0176511 A1 | | 6/2016 | Norwitz et al. | |
| 2018/0148167 A1 | * | 5/2018 | Bihel | B64C 13/14 |

FOREIGN PATENT DOCUMENTS

CA 2156928 A1 9/1994

OTHER PUBLICATIONS

Canadian Exam Report; Application No. 2,997,121; CIPO; May 3, 2019.

* cited by examiner

*Primary Examiner* — Brian M O'Hara
(74) *Attorney, Agent, or Firm* — Lawrence Youst PLLC

(57) ABSTRACT

A cyclic stick for transmitting control commands to blades of a rotorcraft via at least one transmission member, including a grip configured for engagement with a pilot's hand, a control arm and at least one locking mechanism. The control arm has a bottom end configured for connection to the transmission member(s) and for rotational connection to a base support structure, and a top end pivotally connected to the grip. The control arm includes first and second arm portions pivotally connected to each other, the first arm portion defining the bottom end, the second arm portion defining the top end. The locking mechanism(s) selectively prevent a relative pivoting motion between the first and second arm portions and a relative pivoting motion between the second arm portion and the grip. A method of adjusting a position of a grip of a cyclic stick in a rotorcraft cabin is also discussed.

18 Claims, 5 Drawing Sheets

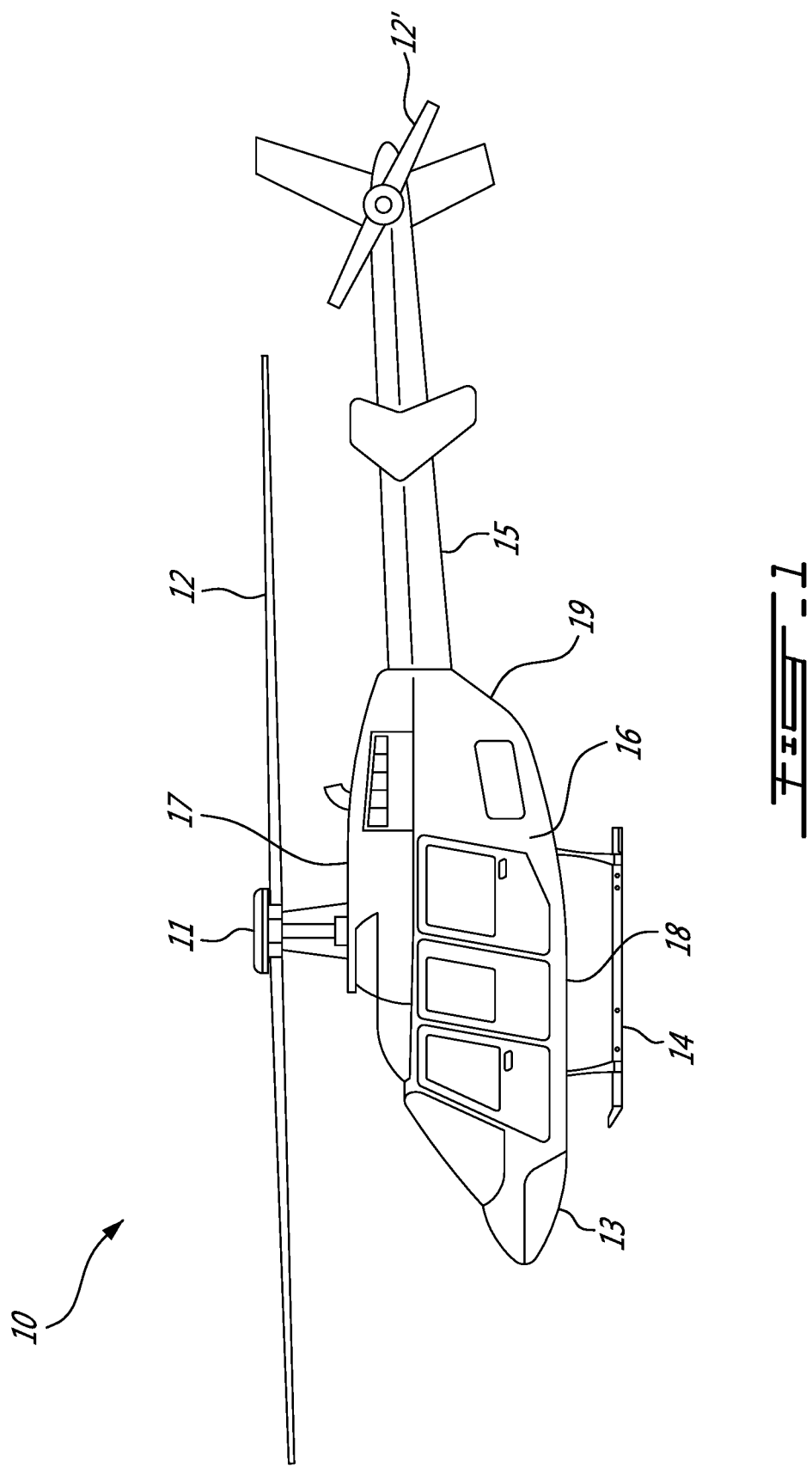

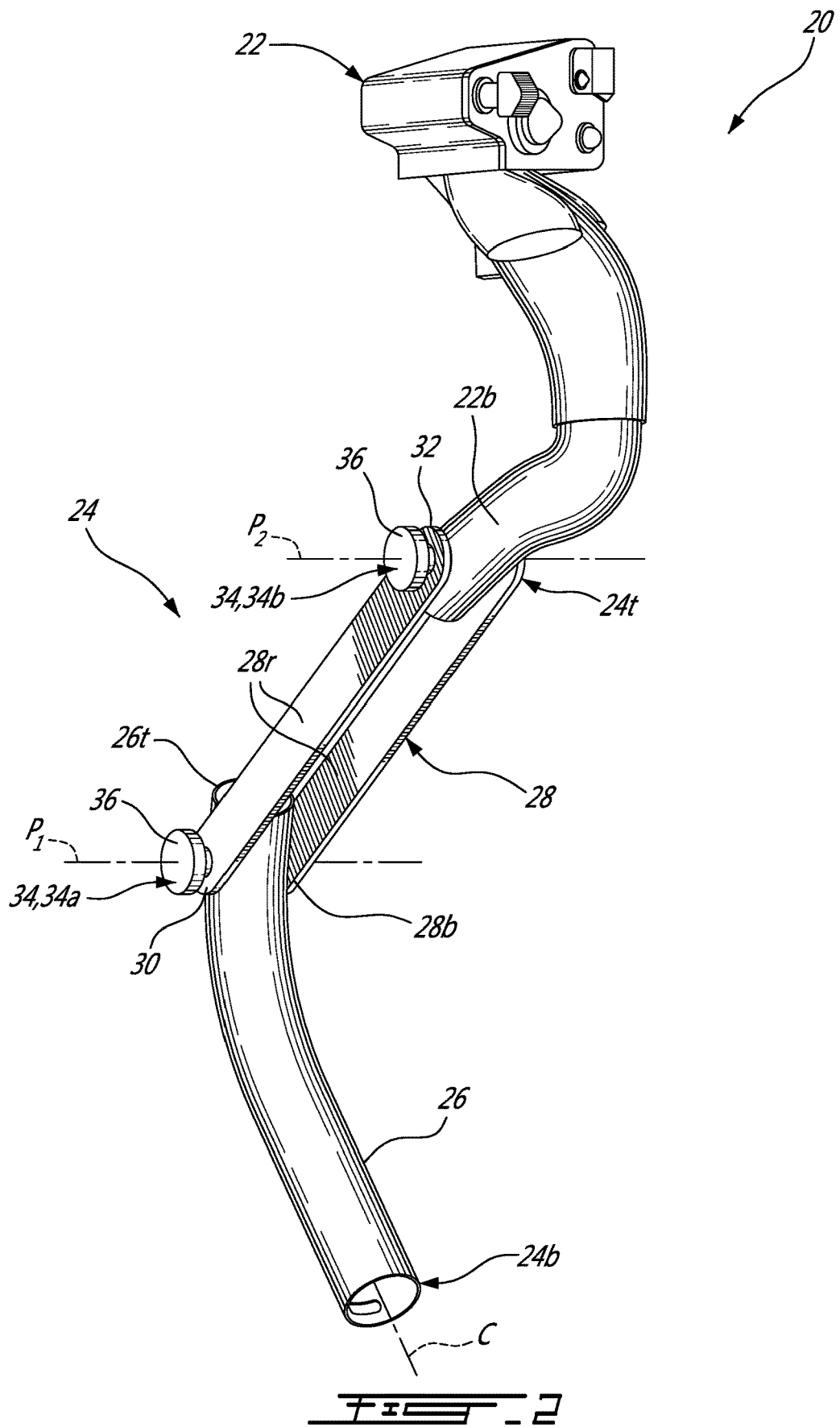

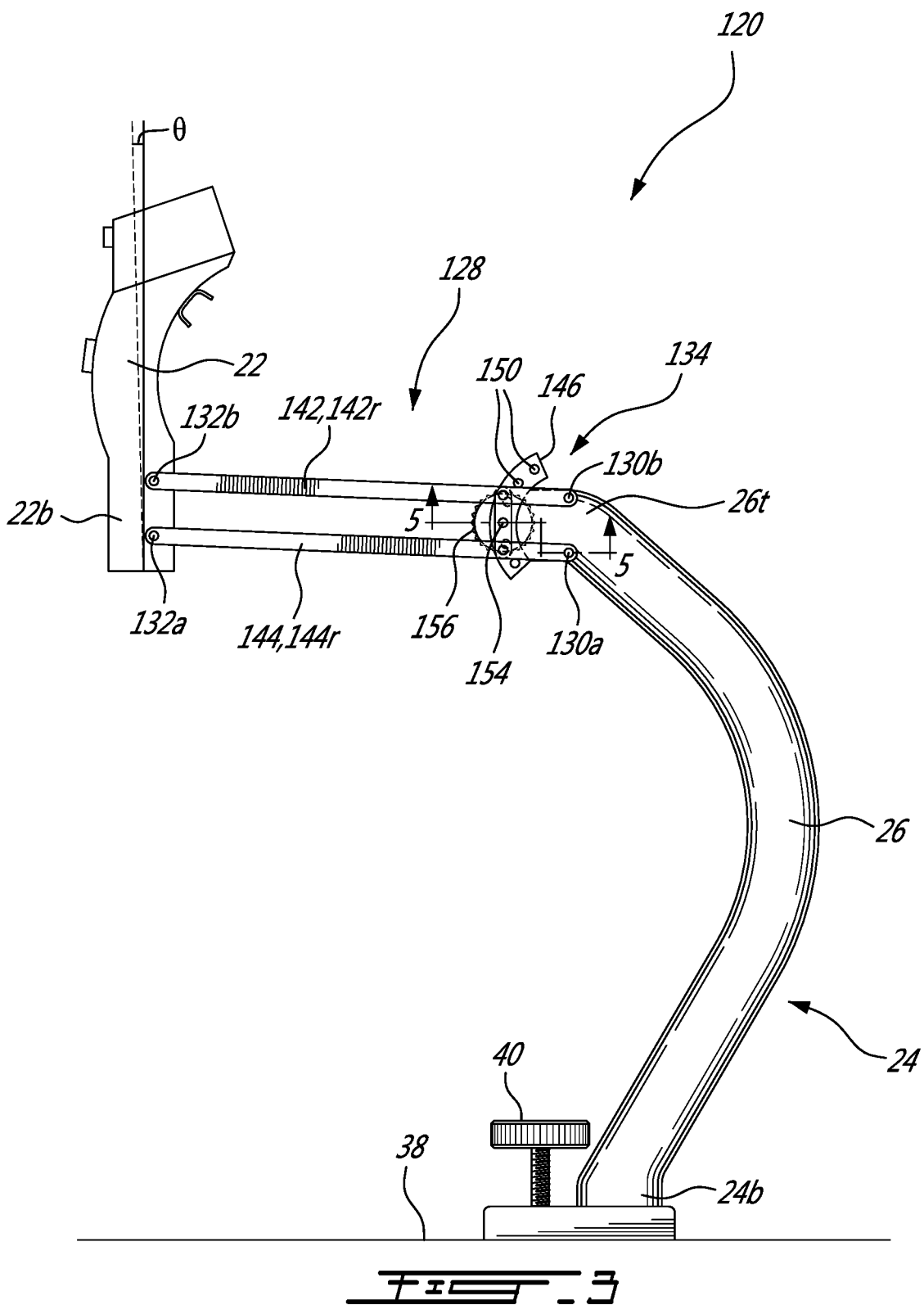

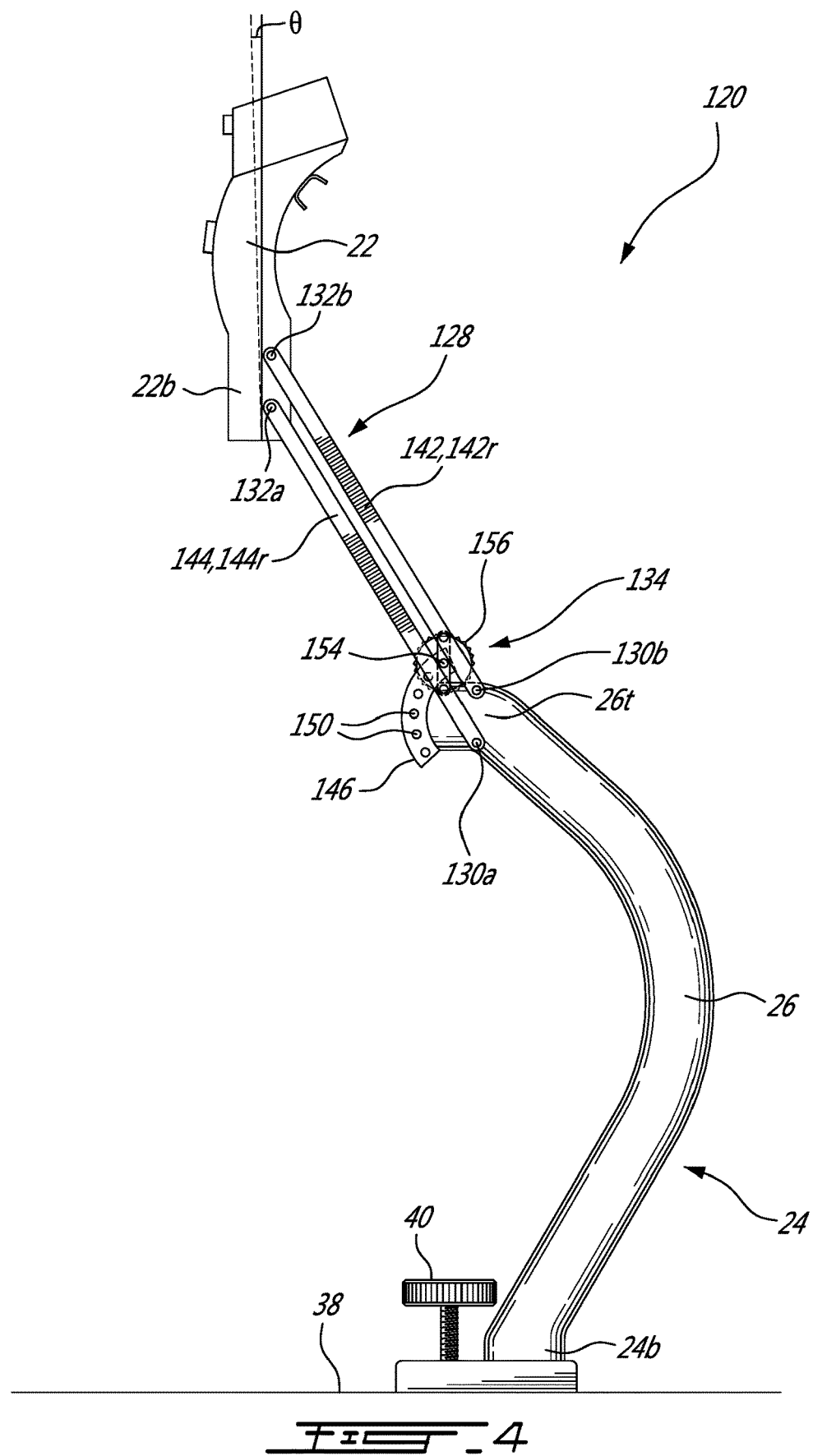

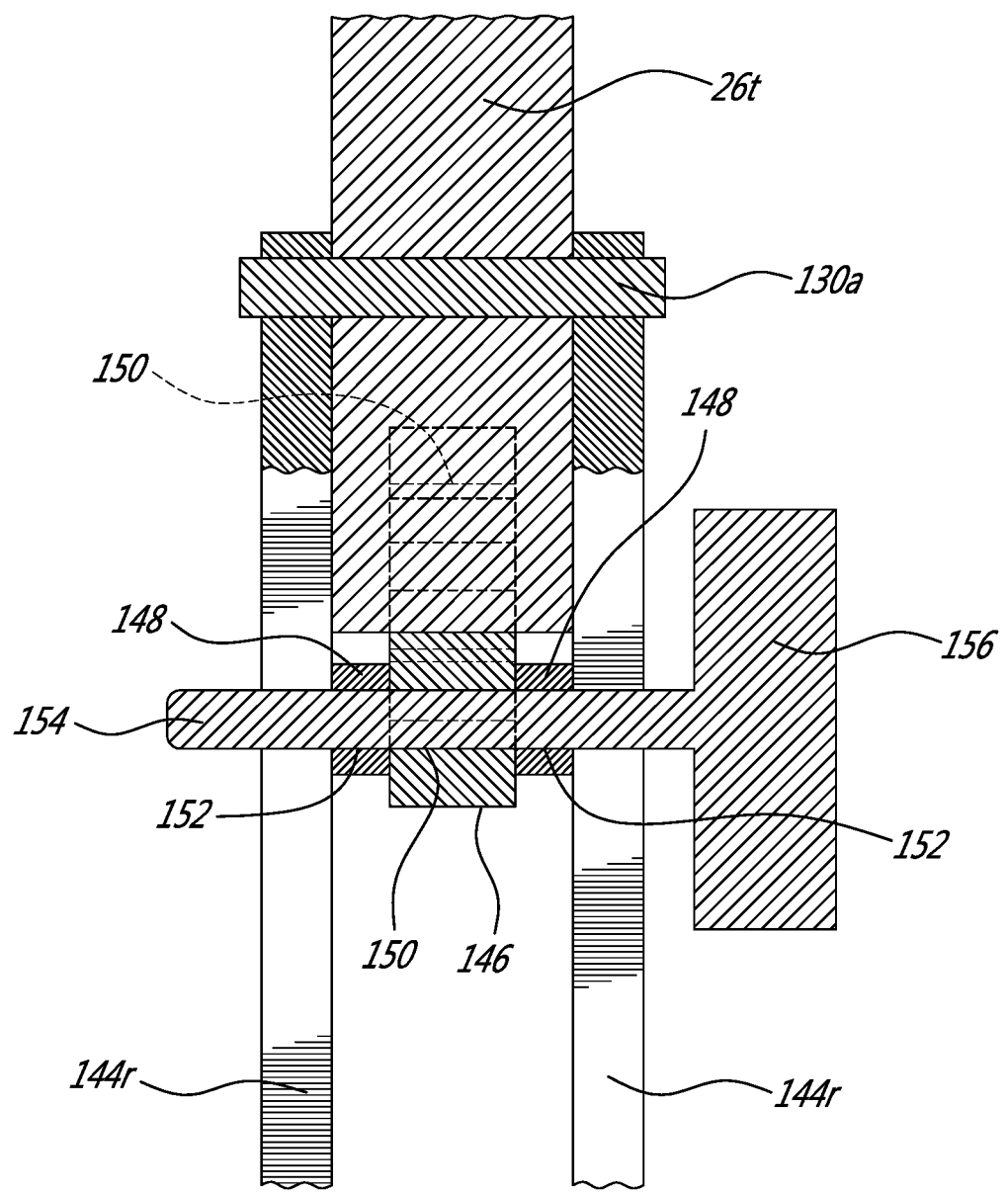

ADJUSTABLE CYCLIC STICK

TECHNICAL FIELD

The application relates generally to flight controls in a rotorcraft and, more particularly, to the cyclic stick used for cyclic control.

BACKGROUND OF THE ART

In a rotorcraft, the position of the grip of the cyclic control relative to the pilot is typically adjusted by moving the pilot seat, for example longitudinally. However, in some rotorcraft the pilot seat has limited adjustment or cannot be adjusted, for example due to the floor structure, the geometry of the cockpit panel and/or the passenger space. Accordingly, the position of the grip is determined based on "standard" or more common body types, which may result in reduced comfort and/or efficiency for pilots having different body types.

SUMMARY

In one aspect, there is provided a cyclic stick for transmitting control commands to blades of a rotorcraft via at least one transmission member, the cyclic stick comprising: a grip configured for engagement with a pilot's hand; a first arm portion having a bottom end configured for connection to the at least one transmission member and for rotational connection to a base support structure, and a top end opposite the bottom end; a second arm portion having opposed first and second ends, the first end pivotally connected to the top end of the first arm portion via at least one first revolute joint, the second end pivotally connected to the grip via at least one second revolute joint; and at least one locking mechanism selectively preventing rotation of the at least one first revolute joint and of the at least one second revolute joint.

In another aspect, there is provided a cyclic stick for transmitting control commands to blades of a rotorcraft via at least one transmission member, the cyclic stick comprising: a grip configured for engagement with a pilot's hand; a control arm having a bottom end configured for connection to the at least one transmission member and for rotational connection to a base support structure, and a top end pivotally connected to the grip, the control arm including first and second arm portions pivotally connected to each other, the first arm portion defining the bottom end, the second arm portion defining the top end; and at least one locking mechanism selectively preventing a relative pivoting motion between the first and second arm portions and a relative pivoting motion between the second arm portion and the grip.

In a further aspect, there is provided a method of adjusting a position of a grip of a cyclic stick in a rotorcraft cabin, the cyclic stick including a control arm supporting the grip, the method comprising: pivoting a second arm portion of the control arm relative to a first arm portion of the control arm, the first arm portion connected to at least one transmission member for transmitting control commands to blades of the rotorcraft; pivoting the grip relative to the second arm portion; locking an angular position of the grip relative to the second arm portion to prevent relative motion therebetween; and locking an angular position of the second arm portion relative to the first arm portion to prevent relative motion therebetween.

DESCRIPTION OF THE DRAWINGS

Reference is now made to the accompanying figures in which:

FIG. 1 is a schematic side view of a rotorcraft in accordance with a particular embodiment;

FIG. 2 is a schematic tridimensional view of a cyclic stick in accordance with a particular embodiment, which may be used in a rotorcraft such as shown in FIG. 1;

FIG. 3 is a schematic side view of a cyclic stick in accordance with another particular embodiment, showing the grip in a first position;

FIG. 4 is a schematic side view of the cyclic stick of FIG. 3, showing the grip in a second position; and FIG. 5 is a schematic cross-sectional view of part of the cyclic stick of FIGS. 3-4 taken along line 5-5 in FIG. 3, showing details of a locking mechanism thereof.

DETAILED DESCRIPTION

Illustrative embodiments of the methods and apparatuses are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "top", "bottom", "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 shows a rotorcraft 10 according to one example embodiment. Rotorcraft 10 features a rotor system 11, blades 12, a fuselage 13, a landing gear 14, and an empennage 15. Rotor system 11 rotates blades 12. Rotor system 11 includes a control system for selectively controlling the pitch of each blade 12 in order to selectively control direction, thrust, and lift of rotorcraft 10. Fuselage 13 represents the body of rotorcraft 10 and is coupled to rotor system 11 such that rotor system 11 and blades 12 may move fuselage 13 through the air. Landing gear 14 supports rotorcraft 10 when rotorcraft 10 is landing and/or when rotorcraft 10 is at rest on the ground. Empennage 15 represents the tail section of the aircraft and features components of a rotor system 11 and blades 12'. Blades 12' may provide thrust in the same direction as the rotation of blades 12 so as to counter the torque effect created by rotor system 11 and blades 12.

Referring to FIG. 2, the control system of the rotorcraft 10 includes a cyclic stick 20, which is connected to the blades 12 of the rotor system 11 (FIG. 1) such that manipulation of the cyclic stick 20 produces a change in the pitch or feathering angle of the blades 12 cyclically. The cyclic stick 20 allows changing of the angle of attack and thus the lift generated by the individual blades 12 around the rotor disk. Manipulation of the cyclic stick 20 accordingly results in the rotor disk tilting in a desired direction so that the rotorcraft 10 moves in that desired direction. It is understood that the control system also includes other components which are not shown, such as for example a collective pitch control configured to collectively change the pitch angle of the blades 12 of the rotor system 11 so as to increases or decreases the total lift produced by the rotor system 11, anti-torque pedals, throttle, etc.

The cyclic stick 20 includes a grip 22 which is configured for engagement with a pilot's hand, and a control arm 24 having a top end 24t connected to the grip 22 and an opposed bottom end 24b. The bottom end 24b is suitably configured to be connected to one or more transmission member(s) (not shown) allowing transmission of the commands produced on the grip 22 and acting on the control arm 24 to be transmitted to the blades 12 of the rotor system 11. The transmission member(s) can be part of a mechanical transmission assembly and include for example one or more control rod(s) (not shown) suitably connected to the bottom end 24b of the control arm 24. Alternately, the transmission member(s) can be part of an electronic transmission assembly and include for example one or more sensor(s) (not shown) suitably connected to the bottom end 24b of the control arm 24. It is understood that any suitable transmission member(s) allowing for the commands of the cyclic stick 20 to be transmitted to the blades 12 can be used.

The bottom end 24b of the control arm 24 is also configured for rotational connection to a base support structure, so as to maintain the cyclic stick 20 in position within the rotorcraft cabin while allowing the cyclic stick 20 to be actuated as required for providing the control commands (for example, while allowing a pivoting motion at the bottom end 24b about two perpendicular axes). In a particular embodiment, the cyclic stick 20 is positioned so as to be located between the pilot's legs. The bottom end 24b of the control arm 24 may be rotationally connected to a base support structure which is connected to or which forms part of the floor of the cabin.

In some situations, it may be desirable to adjust the absolute position (e.g. adjustment in height and longitudinally) of the grip 22 of the cyclic stick 20 for increased comfort and/or efficiency during manipulation by the pilot; such situations may include, but are not limited to, in rotorcraft where adjustment of the position of the pilot seat is limited or not possible. The cyclic stick 20 is accordingly configured to allow adjustment of the position of the grip 22 within the cabin, e.g. the position of the grip relative to the bottom end 24b of the control arm 24.

In the present disclosure, including claims, the term "absolute" is used in reference to the structure of the rotorcraft cabin. Accordingly, the absolute position of the grip 22 may be defined with respect to relevant structure of the rotorcraft cabin, for example by a vertical and longitudinal distance with respect to a reference point on the pilot seat, and the absolute orientation may be defined an angle with respect to the vertical direction when the rotorcraft 10 rests on a horizontal surface, also referred herein as "vertical angle".

Still referring to FIG. 2, the control arm 24 generally includes a first arm portion 26 and a second arm portion 28. The first arm portion 26 defines the bottom end 24b of the control arm 24, and has a top end 26t opposite the bottom end 24b. In the embodiment shown, the first arm portion 26 is defined by a tube having a curved central axis C and a circular cross-section. Other configurations are also possible.

The second arm portion 28 defines the top end 24t of the control arm 24, which is pivotally connected to the grip 22. The second arm portion 28 has an opposed end 28b opposed to the top end 24t of the control arm 24. The opposed end 28b is pivotally connected to the top end 26t of the first arm portion 26. The pivotal connection between the first and second arm portions 26, 28 is defined by at least one revolute joint 30, and the pivotal connection between the second arm portion 28 and the grip 22 is also defined by at least one other revolute joint 32.

In the present disclosure, including claims, the term "revolute joint" is intended to designate a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint.

Still referring to FIG. 2, in the embodiment shown, the second arm portion 28 is defined by a pair of rods 28r spaced apart (e.g. horizontally spaced apart) from each other and extending on opposed sides of the first arm portion 26 and grip 22, so that the top end 26t of the first arm portion 26 and the bottom end 22b of the grip 22 are received between the rods 28r. The rods 28r are straight and extend parallel to each other. The pivotal connection between the first and second arm portions 26, 28 is defined by a single revolute joint 30, formed for example by a pin extending through the rods 28r at the opposed end 28b and through the top end 26t of the first arm portion 26 received between the rods 28r. The pivotal connection between the second arm portion 28 and the grip 22 is defined by a single revolute joint 32, formed for example by another pin extending through the rods 28r at the top end 24t and through the bottom end 22b of the grip 22 received between the rods 28r. The revolute joints 30, 32 define pivot axes $P_1$, $P_2$ that are parallel to each other.

The cyclic stick 20 further includes one or more locking mechanism(s) 34 selectively preventing rotation of the revolute joints 30, 32, so as to block or fix the relative angular positions of the first arm portion 26, second arm portion 28 and grip 22 once the desired absolute position of the grip 22 is obtained.

In the embodiment shown, the revolute joints 30, 32 are pivotable independently from each other. Two distinct locking mechanisms 34 are provided: a first locking mechanism 34a selectively preventing rotation of the first revolute joint 30 and a second locking mechanism 34b selectively preventing rotation of the second revolute joint 32. In this embodiment, the orientation of the grip 22 is not automatically maintained when its position is adjusted via the revolute joints 30, 32. The height and proximity of the grip 22 with respect to the pilot (e.g. longitudinal and vertical position) is adjusted through rotation about the first revolute joint 30, and the orientation of the grip 22 is adjusted through rotation about the second revolute joint 32. Once the desired absolute position and orientation of the grip 22 is obtained, each revolute joint 30, 32 is individually locked to prevent further rotation.

In a particular embodiment, each locking mechanism 34 includes a knob 36 provided at the respective revolute joint 30, 32 and providing a friction lock, for example via a washer (not shown) with serrations engaging complementary structure on the components of the joint 30, 32 and maintained in engagement therewith by a suitable friction force. It is understood that any suitable locking mechanism(s) allowing to selectively prevent rotation about the revolute joints 30, 32 may be used, provided that they allow to maintain the relative orientations of the first arm portion 26, second arm portion 28 and grip 22 upon application of the expected actuation forces on the grip 22 that are required for piloting of the rotorcraft 10, including, but not limited to, spring loaded pin(s), and suitable friction device(s).

In a particular embodiment, the cyclic stick 20 thus allows vertical and longitudinal adjustments in the absolute position of the grip 22, which may facilitate pilotage for short pilots as well as for pilots that have a larger abdomen without comprising the HIC (Head impact envelope) test. The cyclic stick 20 may thus facilitate pilotage for a greater range of pilot sizes, particularly, but not exclusively, in rotorcraft where adjustment of the position of the pilot seat is limited or not possible.

In a particular embodiment, the cyclic stick 20 may also facilitate slope landing maneuvers by allowing an increase in the space between the collective control and the cyclic control.

Referring to FIGS. 3-5, a cyclic stick 120 in accordance with another embodiment is shown, where elements similar to that of the cyclic stick of FIG. 2 are identified by the same reference numerals and will not be further described herein. In this embodiment, the bottom end 24b of the control arm 24 is shown to be rotationally connected to the base support structure 38, which is connected to or which forms part of the floor of the cabin. A friction mechanism 40 is provided at the rotational connection between the bottom end 24b and the base support structure 38, configured to provide an adjustable amount of friction resisting the rotation of the bottom end 24b with respect to the base support structure 38, so as to adjust the "feel" of the cyclic stick 120 upon manipulation. Other configurations are also possible. Although not shown in FIG. 2, it is understood that the bottom end 24b of the control arm 24 of FIG. 2 may be similarly connected.

The cyclic stick 120 also allows vertical and longitudinal adjustments in the absolute position of the grip 22, and may also facilitate slope landing maneuvers by allowing an increase in the space between the collective control and the cyclic control. However, the cyclic stick 120 of FIGS. 3-5 may allow for easier adjustment as compared to the cyclic stick 20 of FIG. 2 by maintaining the absolute orientation of the grip 22 throughout the adjustment, as detailed further below.

In this embodiment and as can be best seen in FIGS. 3-4, the second arm portion 128 includes two vertically spaced apart members 142, 144 parallel to each other. Each member is defined by a pair of parallel straight rods 142r, 144r (see FIG. 5) spaced apart (e.g. horizontally spaced apart) from each other and extending on opposed sides of the first arm portion 26 and grip 22. Each member 142, 144, i.e. each pair of rods 142r, 144r, has one end pivotally connected to the first arm portion 26 via a respective revolute joint 130a, 130b, and an opposed end pivotally connected to the grip 22 via another respective revolute joint 132a, 132b. The pivotal connection between the first and second arm portions 26, 128 is thus defined by two revolute joints 130a, 130b, each formed for example by a respective pin extending through the rods 142r, 144r of the respective member 142, 144 and through the top end 26t of the first arm portion 26 received between the rods 142r, 144r of each member 142, 144. The pivotal connection between the second arm portion 128 and the grip 22 is thus also defined by two revolute joints 132a, 132b, each formed for example by a respective pin extending through the rods 142r, 144r of the respective member 142, 144 and through the bottom end 22b of the grip 22 received between the rods 142r, 144r of each member 142, 144. The pivot axes of the revolute joints 130a, 130b, 132a, 132b are parallel to each other.

The members 142, 144 of the second arm portion 128, the bottom end 22b of the grip 22 and the top end 26t of the first arm portion 26 thus together define a planar four bar linkage which constrains the pivot connections so that the relative pivot motion between the grip 22 and second arm portion 128 and the relative pivot motion between the first and second arm portions 26, 128 are linked. As illustrated by the two different positions of FIGS. 3 and 4, the absolute orientation of the grip 22 remains the same throughout the changes in relative orientations between the grip 22 and second arm portion 128 and between the first and second arm portions 26, 128. In a particular embodiment, this facilitates the adjustment of the absolute position of the grip 22 by the user since the absolute orientation (e.g. vertical angle A) of the grip 22 is maintained constant during the adjustment.

Moreover, since the relative pivot motion between the grip 22 and second arm portion 128 and the relative pivot motion between the first and second arm portions 26, 128 are linked, blocking of one of the pivot motions results in also blocking of the other. Accordingly, in this embodiment a single locking mechanism 134 is provided. In the embodiment shown, the locking mechanism 134 selectively prevents the relative pivoting motion between the first and second arm portions 26, 128. When the relative pivoting motion between the first and second arm portions 26, 128 is blocked, the relative pivoting motion between the grip 22 and the second arm portion 128 is also blocked.

In the embodiment shown, the locking mechanism 134 includes a first connector 146 rigidly connected to the first arm portion 26 and at least one second connector 148 (see FIG. 5) rigidly connected to the second arm portion 128. Each connector 146, 148 may be rigidly connected to the respective arm portion 26, 128 by being an integral part of the respective arm portion 26, 128, for example forming a monolithic element with a part or a whole of the respective arm portion 26, 128. Alternately each connector 146, 148 may be formed separately from the respective arm portion 26, 128 and rigidly connected thereto through any suitable type of connection, including, but not limited to, permanent connections such as welding, brazing, etc. In the embodiment shown, the first connector 146 is configured as an arcuate plate formed separately from and rigidly connected to the first arm portion 26 so as to extend between the rods 142r, 144r of the second arm portion 128. In the embodiment shown and as can be seen in FIG. 5, two second connectors 148 are provided, each configured as a plate formed separately from and rigidly connected to the rods 142r, 144r extending on the respective side of the top end 26t of the first arm portion 26, so that the first connector 146 is received between the two second connectors 148. Other configurations are also possible.

Referring to FIGS. 3-4, the first connector 146 has a plurality of spaced apart holes 150 defined therethrough, disposed along an arcuate path. Referring to FIG. 5, each second connector 148 has at least one hole 152 defined therethrough, with the holes 152 in both second connectors 148 being aligned with each other. The arcuate path of the holes 150 in the first connector 146 and the position of the holes 152 in the second connectors 148 are defined so that the holes 152 in the second connectors 148 are in successive alignment with each of the holes 150 of the first connector 146 as the second arm portion 128 pivots relative to the first arm portion 26. It is understood that the configuration of the connectors may be reversed, so that connector(s) with multiple holes disposed along an arcuate path is/are connected to the second arm portion 128 for alignment with a hole defined in one or more complementary connector(s) connected to the first arm portion 26.

Still referring to FIG. 5, the locking mechanism 134 further includes a locking pin 154 connected to a knob 156. The pin 154 is selectively engageable through the holes 152 of the second connectors 148 and the selected one of the holes 150 of the first connector 146 alignment therewith, so as to fix the relative angular position of the first and second arm portions 26, 128. Although not shown, the locking mechanism 134 may further include any suitable element preventing accidental removal of the pin 154 from the holes 150, 152 when engaged therein.

Accordingly, the locking mechanism 134 prevents the rotation of the revolute joints 130a, 130b, 132a, 132b only for a plurality of discrete angular positions of the second arm portion 128 relative to the first arm portion 26 and for a corresponding plurality of discrete angular positions of the grip 22 relative to the second arm portion 128. In the embodiment shown, FIG. 3 depicts the highest absolute position of the grip 22, with the pin 154 of the locking mechanism 134 received in the highest of the holes 150 of the first connector 146, and FIG. 4 depicts the lowest absolute position of the grip 22, with the pin 154 of the locking mechanism 134 received in the lowest of the holes 150 of the first connector 146. The angular distance between the discrete relative angular positions is determined by the distance between the adjacent holes 150 in the first connector 146, and the number of discrete relative angular positions is determined by the number of holes 150 in the first connector 146. The number of holes 150 and distance between adjacent holes 150 in the first connector 146 is thus selected based on a desired range for the adjustment. Other configurations are also possible.

It is understood that any other suitable type of locking mechanism may alternately be used, Moreover, it is understood that the locking mechanism 134 shown in FIGS. 3-4 may replace any or both of the locking mechanisms 34 of the cyclic stick of FIG. 2.

In use in accordance with a particular embodiment, the absolute position of the grip 22 is thus adjusted by pivoting the second arm portion 28, 128 relative to the first arm portion 26, pivoting the grip 22 relative to the second arm portion 28, 128, locking the angular position of the grip 22 relative to the second arm portion 28, 128 to prevent relative motion therebetween, and locking the angular position of the second arm portion 28, 128 relative to the first arm portion 26 to prevent relative motion therebetween. In a particular embodiment, pivoting the second arm portion 28, 128 relative to the first arm portion 26 and pivoting the grip 22 relative to the second arm portion 28, 128 are performed about parallel pivot axes. In a particular embodiment such as shown for example in FIGS. 3-5, pivoting the second arm portion 128 relative to the first arm portion 26 and pivoting the grip 22 relative to the second arm portion 128 are performed simultaneously, and locking the angular position of the grip 22 relative to the second arm portion 128 and locking the angular position of the second arm portion 128 relative to the first arm portion 26 are also performed simultaneously.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A cyclic stick for transmitting control commands to blades of a rotorcraft via at least one transmission member, the cyclic stick comprising:
    a grip configured for engagement with a pilot's hand;
    a first arm portion having a bottom end configured for connection to the at least one transmission member and for rotational connection to a base support structure, and a top end opposite the bottom end;
    a second arm portion having opposed first and second ends, the first end pivotally connected to the top end of the first arm portion via at least one first revolute joint, the second end pivotally connected to the grip via at least one second revolute joint; and
    at least one locking mechanism selectively preventing rotation of the at least one first revolute joint for a plurality of discrete relative angular positions of the second arm portion relative to the first arm portion and selectively preventing rotation of the at least one second revolute joint for a plurality of discrete relative angular positions of the grip relative to the second arm portion.

2. The cyclic stick as defined in claim 1, wherein the at least one locking mechanism selectively prevents the rotation of the at least one first revolute joint only for the plurality of discrete relative angular positions of the second arm portion relative to the first arm portion and selectively prevents the rotation of the at least one second revolute joint only for the plurality of discrete relative angular positions of the grip relative to the second arm portion.

3. The cyclic stick as defined in claim 1, wherein the at least one first revolute joint and the at least one second revolute joint define pivot axes parallel to each other.

4. The cyclic stick as defined in claim 1, wherein the at least one first revolute joint is a single first revolute joint and the at least one second revolute joint is a single second revolute joint, the first and second revolute joints being pivotable independently from each other, the at least one locking mechanism including a first locking mechanism selectively preventing rotation of the first revolute joint and a second locking mechanism selectively preventing rotation of the second revolute joint.

5. The cyclic stick as defined in claim 1, wherein the second arm portion includes first and second members parallel to each other, the at least one first revolute joint including two first revolute joints and the at least one second revolute joint including two second revolute joints, each of the first and second members pivotally connected to the first arm portion via a respective one of the two first revolute joints and pivotally connected to the grip via a respective one of the two second revolute joints.

6. The cyclic stick as defined in claim 5, wherein the at least one locking mechanism includes a single locking mechanism.

7. The cyclic stick as defined in claim 5, wherein the first member of the second arm portion includes a first pair of rods spaced apart from each other and extending on opposed sides of the first arm portion and grip, and the second member of the second arm includes a second pair of rods spaced apart from each other and extending on opposed sides of the first arm portion and grip, each of the first and second pairs of rods pivotally connected to the first arm portion via the respective one of the two first revolute joints and pivotally connected to the grip via the respective one of the two second revolute joints.

8. The cyclic stick as defined in claim 1, wherein the least one locking mechanism includes a first connector rigidly connected to one of the first and second arm portions and a second connector rigidly connected to the other of the first and second arm portions, the first connector having a plurality of spaced apart first holes defined therethrough, the second connector having a second hole defined therethrough positioned so as to be in successive alignment with each of the first holes throughout a rotation of the second arm portion about the at least one revolute joint, the locking mechanism further including a pin selectively engageable through the second hole and a selected one of the first holes in alignment with the second hole to fix a relative angular position of the first and second arm portions.

9. A cyclic stick for transmitting control commands to blades of a rotorcraft via at least one transmission member, the cyclic stick comprising:
 a grip configured for engagement with a pilot's hand;
 a control arm having a bottom end configured for connection to the at least one transmission member and for rotational connection to a base support structure, and a top end pivotally connected to the grip, the control arm including first and second arm portions pivotally connected to each other about a first pivot axis, the grip pivotable relative to the second arm portion about a second pivot axis parallel to the first pivot axis, the first arm portion defining the bottom end, the second arm portion defining the top end; and
 at least one locking mechanism selectively preventing a relative pivoting motion between the first and second arm portions and a relative pivoting motion between the second arm portion and the grip.

10. The cyclic stick as defined in claim 9, wherein the at least one locking mechanism selectively prevents the relative pivoting motion between the first and second arm portions only for a plurality of discrete relative angular positions of the second arm portion relative to the first arm portion and selectively prevents the relative pivoting motion between the second arm portion and the grip only for a plurality of discrete relative angular positions of the grip relative to the second arm portion.

11. The cyclic stick as defined in claim 9, wherein the at least one locking mechanism includes first and second separate locking mechanisms, the first locking mechanism selectively preventing the relative pivoting motion between the first and second arm portions about the first pivot axis and the second locking mechanism selectively preventing the relative pivoting motion between the second arm portion and the grip about the second pivot axis.

12. The cyclic stick as defined in claim 9, wherein the second arm portion includes first and second members parallel to each other, each of the first and second members pivotable relative to the first arm portion about a respective one of two first pivot axes spaced from each other, and pivotable relative to the grip about a respective one of two second pivot axes spaced from each other, the first and second pivot axes all parallel to each other.

13. The cyclic stick as defined in claim 12, wherein the at least one locking mechanism includes a single locking mechanism.

14. The cyclic stick as defined in claim 12, wherein the first member of the second arm portion includes a first pair of rods spaced apart from each other and extending on opposed sides of the first arm portion and grip, and the second member of the second arm includes a second pair of rods spaced apart from each other and extending on opposed sides of the first arm portion and grip, each of the first and second pairs of rods pivotable relative to the first arm portion about the respective one of the two first pivot axes and pivotable relative to the grip about the respective one of the two second pivot axes.

15. The cyclic stick as defined in claim 9, wherein the least one locking mechanism includes a first connector rigidly connected to one of the first and second arm portions and a second connector rigidly connected to the other of the first and second arm portions, the first connector having a plurality of spaced apart first holes defined therethrough, the second connector having a second hole defined therethrough positioned so as to be in successive alignment with each of the first holes throughout the relative pivoting motion between the first and second arm portions, the locking mechanism further including a pin selectively engageable through the second hole and a selected one of the first holes in alignment with the second hole to fix a relative angular position of the first and second arm portions.

16. A method of adjusting a position of a grip of a cyclic stick in a rotorcraft cabin, the cyclic stick including a control arm supporting the grip, the method comprising:
 pivoting a second arm portion of the control arm relative to a first arm portion of the control arm, the first arm portion connected to at least one transmission member for transmitting control commands to blades of the rotorcraft;
 pivoting the grip relative to the second arm portion, wherein pivoting the second arm portion relative to the first arm portion and pivoting the grip relative to the second arm portion are performed about parallel pivot axes;
 locking an angular position of the grip relative to the second arm portion to prevent relative motion therebetween; and
 locking an angular position of the second arm portion relative to the first arm portion to prevent relative motion therebetween.

17. The method as defined in claim 16, wherein pivoting the second arm portion relative to the first arm portion and pivoting the grip relative to the second arm portion are performed simultaneously.

18. The method as defined in claim 16, wherein locking the angular position of the grip relative to the second arm portion and locking the angular position of the second arm portion relative to the first arm portion are performed simultaneously.

* * * * *